US012200432B2

(12) United States Patent
Yi et al.

(10) Patent No.: US 12,200,432 B2
(45) Date of Patent: Jan. 14, 2025

(54) OPEN-EAR EARPHONE

(71) Applicant: UI (Wan An) Technology Co. Ltd, Ji'an (CN)

(72) Inventors: Jiaquan Yi, Ji'an (CN); Xiaobin Shen, Ji'an (CN); Shenfa Wan, Ji'an (CN); Yafan Li, Ji'an (CN); Yunfeng Wang, Ji'an (CN); Zhaoquan Mai, Ji'an (CN); Qian He, Ji'an (CN); Hui He, Ji'an (CN); Shaobing Lai, Ji'an (CN); Zhuoqi Chen, Ji'an (CN); Yong Wang, Ji'an (CN); Jiabao Chen, Ji'an (CN); Lei Bao, Ji'an (CN); Nan Feng, Ji'an (CN)

(73) Assignee: UI (Wan An) Technology Co. Ltd, Ji'an (CN)

( * ) Notice: Subject to any disclaimer, the term of this patent is extended or adjusted under 35 U.S.C. 154(b) by 211 days.

(21) Appl. No.: 18/103,499

(22) Filed: Jan. 31, 2023

(65) Prior Publication Data

US 2024/0147143 A1 May 2, 2024

(30) Foreign Application Priority Data

Oct. 27, 2022 (CN) ........................ 202211329036.5

(51) Int. Cl.
*H04R 1/28* (2006.01)
*H04R 1/10* (2006.01)

(52) U.S. Cl.
CPC .......... *H04R 1/288* (2013.01); *H04R 1/1008* (2013.01); *H04R 1/1075* (2013.01); *H04R 2460/11* (2013.01)

(58) Field of Classification Search
CPC .... H04R 1/288; H04R 1/1008; H04R 1/1075; H04R 2460/11; H04R 1/2846; H04R 1/2842; H04R 1/1058; H04R 2201/105
See application file for complete search history.

(56) References Cited

U.S. PATENT DOCUMENTS 11,122,351 B2 9/2021 Struzik
2018/0352318 A1* 12/2018 Yoneyama ............. H04R 1/288
2023/0276159 A1* 8/2023 Liu ..................... H04R 1/1075
381/370

* cited by examiner

*Primary Examiner* — Tuan D Nguyen
(74) *Attorney, Agent, or Firm* — Bayramoglu Law Offices LLC

(57) ABSTRACT

An open-ear earphone includes a housing, a chamber is provided inside the housing, a speaker is provided inside the chamber and divides the chamber into a front chamber and a rear chamber. The housing is provided with a first sound hole and a second sound hole. The front chamber is communicated to the outside through the first sound hole, and the rear chamber is communicated to the outside through the second sound hole. The rear chamber includes a first volume down chamber and a second volume down chamber communicated to the first volume down chamber, and the first volume down chamber is located between the speaker and the second volume down chamber. The sound wave in backward motion generated by the speaker is transmitted to the outside from the second sound hole after being reduced by the first volume down chamber and the second volume down chamber.

14 Claims, 1 Drawing Sheet

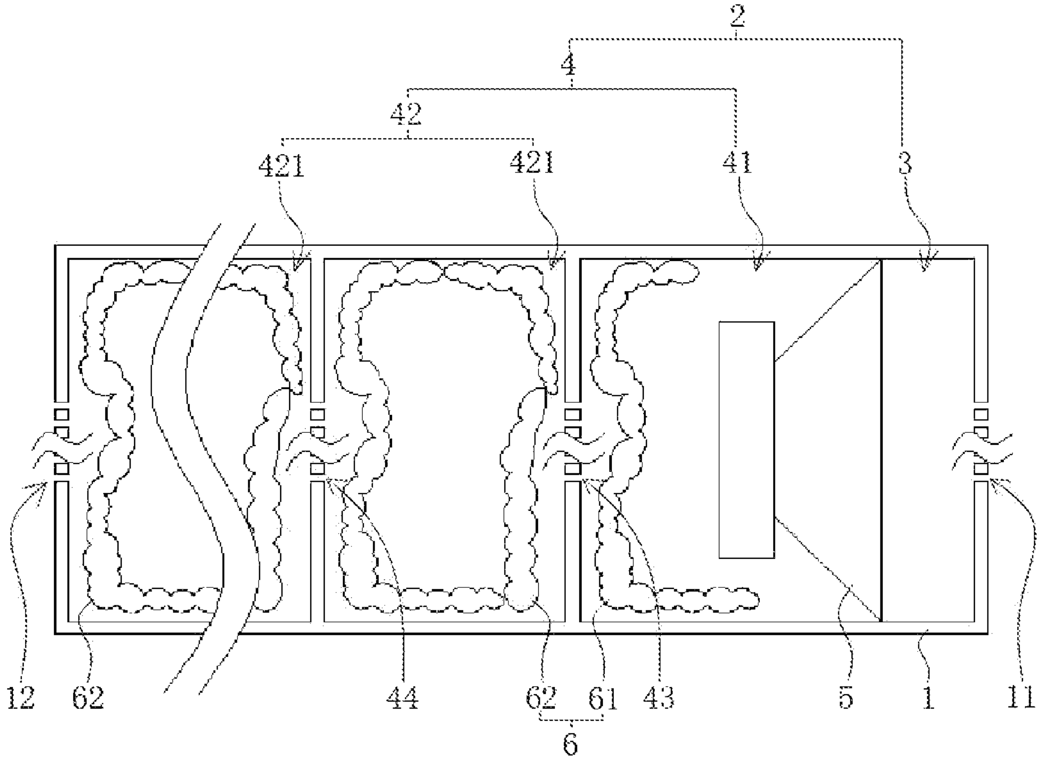
2
4
42
421
421
41
3
12
62
44
62
61
43
5
1
11
6

OPEN-EAR EARPHONE

CROSS REFERENCE TO THE RELATED APPLICATIONS

This application is based upon and claims priority to Chinese Patent Application No. 202211329036.5, filed on Oct. 27, 2022, the entire contents of which are incorporated herein by reference.

TECHNICAL FIELD

The present invention relates to the technical field of earphones, particularly an open-ear earphone.

BACKGROUND

Earphones, headphones, headsets, and earpieces are all conversion units that accept electric signals from a media player or a receiver and convert them into an audible sound wave using speakers close to the ears.

Earphones include open-ear earphones, in-ear earphones, semi-in-ear earphones, and earmuff earphones. Compared with in-ear earphones, open-ear earphones have no sense of isolation from the outside; the sound from the earphones can leak outside while outside sounds can be heard.

The prior art open-ear earphones may be affected by an acoustic short-circuit phenomenon. The acoustic short-circuit means that the sound wave created by the forward motion of the diaphragm of the speaker and the sound wave created by the backward motion of the diaphragm of the speaker are phase-reversed, which makes the sound waves offset each other. In general, the sound wave in a forward motion is greatly weakened by the sound wave in a backward motion, such that the sound in a forward motion is also very light. As a result, the sound emitted by the speaker cannot be efficiently transmitted to the target ears, or even if the sound emitted by the speaker can be transmitted to the target ears, the quality of the sound will decline. For example, a patent (U.S. Ser. No. 11/122,351B2) discloses an open audio device (that is, an open-ear earphone) that sets a front chamber in front of a speaker and a rear chamber behind the speaker. The front chamber is communicated to the outside through a front hole, and the rear chamber is communicated to the outside through a rear hole. Although the rear chamber can reduce the sound wave in a backward motion generated by the speaker to a certain extent, the ability of the rear chamber to reduce the sound wave in a backward motion generated by the speaker is limited. Additionally, due to the short distance between the front hole and the rear hole, when the speaker emits a sound wave, the sound wave emitted from the rear hole radiates to the front hole, resulting in the acoustic short-circuit phenomenon being prone to occur around the front hole (in fact, the acoustic short-circuit phenomenon also occurs around the rear hole, but the acoustic short-circuit phenomenon around the rear hole does not affect the user experience while earphones are worn), thereby reducing user experience while earphones are worn.

SUMMARY

Given the above, an objective of the present invention is to provide an open-ear earphone with a rear chamber consisting of a plurality of chambers to reduce a sound wave in backward motion generated by a speaker. Further, a sound-absorbing material is arranged in the rear chamber, which further reduces the sound wave in backward motion generated by the speaker.

The objective of the present invention is realized through the technical solutions as follows:

An open-ear earphone includes a housing, a chamber is provided inside the housing, a speaker is provided inside the chamber, and the speaker divides the chamber into a front chamber and a rear chamber. The housing is provided with a first sound hole and a second sound hole, the front chamber is communicated to the outside through the first sound hole, and the rear chamber is communicated to the outside through the second sound hole. The rear chamber includes a first volume down chamber and a second volume down chamber communicated to the first volume down chamber, and the first volume down chamber is located between the speaker and the second volume down chamber.

Further, the second volume down chamber includes at least two sound-absorbing chambers communicated to each other. One of the sound-absorbing chambers is located between another one of the sound-absorbing chambers and the first volume down chamber, and another one of the sound-absorbing chambers is communicated to the outside through the second sound hole.

Further, the axis of the first volume down chamber and the axes of the at least two sound-absorbing chambers are located in the same straight line.

Further, the axis of the front chamber, the axis of the first volume down chamber, and the axis of the second volume down chamber are located on the same straight line.

Further, the volume dimension of the rear chamber is greater than the volume dimension of the front chamber.

Further, a sound-absorbing material is also included, and the sound-absorbing material is arranged inside the rear chamber.

Further, the sound-absorbing material includes a first sound-absorbing component and second sound-absorbing components. The first sound-absorbing component is arranged inside the first volume down chamber, and the second sound-absorbing components are arranged inside the second volume down chamber.

Further, the first sound-absorbing component is located on one side of the first volume down chamber away from the speaker, and the first sound-absorbing component is formed with a chamber groove opening toward the speaker.

Further, the second sound-absorbing components are circularly arranged inside the second volume down chamber.

Further, the sound-absorbing material includes one or more of sound-absorbing cotton, organic fiber cotton, inorganic fiber cotton, inorganic foam, and foam plastic.

In summary, the advantages of the present invention are as follows:

Compared with the prior art, the present invention provides an open-ear earphone, which includes a housing, and a chamber formed inside the housing. A speaker is provided inside the chamber and divides the chamber into a front chamber and a rear chamber. The rear chamber includes a first volume down chamber and a second volume down chamber communicated with the first volume down chamber, and the first volume down chamber is located between the speaker and the second volume down chamber. When the speaker generates sound, the sound wave in forward motion generated by the speaker is transmitted from the first sound hole to the outside. When in use, the sound from the first sound hole is transmitted to the user's ears to facilitate the user's hearing of the sound. The sound wave in backward motion generated by the speaker is transmitted to the outside from the second sound hole after being reduced by the first volume down chamber and the second volume down chamber. As the sound wave in backward motion generated by a speaker is reduced by the first volume down chamber and the second volume down chamber, the sound wave in backward motion is significantly reduced, such that the influence of the sound wave in backward motion generated by the speaker on the sound wave in forward motion generated by the speaker is reduced to reduce the occurrence of acoustic short-circuit phenomenon around the first sound hole, which is beneficial to optimize the sound quality and improve the user experience during wearing of the earphone. The front chamber, the first volume down chamber, and the second volume down chamber are arranged between the first sound hole and the second sound hole, which makes the distance between the first sound hole and the second sound hole relatively increased to reduce the influence of the sound transmitted from the second sound hole on the sound transmitted from the first sound hole and to reduce the occurrence of acoustic short-circuit phenomenon around the first sound hole, which is beneficial to further optimize the sound quality and further improve the user experience while the earphone is being worn.

The second volume down chamber includes at least two sound-absorbing chambers communicating with each other. After the sound wave in backward motion generated by the speaker is acted by the first volume down chamber and the at least two sound-absorbing chambers, the sound transmitted from the second sound hole is effectively reduced, thereby reducing the influence of the sound transmitted from the second sound hole on the sound transmitted from the first sound hole and reducing the occurrence of acoustic short-circuit phenomenon, which is beneficial to optimize the sound quality of the earphone and improve the user experience while the earphone is being worn.

A sound-absorbing material is provided inside the rear chamber and absorbs the sound wave in backward motion generated by the speaker. The sound-absorbing material, the first volume down chamber, and the at least two sound-absorbing chambers act together to reduce the sound wave in backward motion generated by the speaker and further reduce the sound transmitted from the second sound hole, thereby reducing the influence of the sound transmitted from the second sound hole on the sound transmitted from the first sound hole and reducing the occurrence of acoustic short-circuit phenomenon, which is beneficial to optimize the sound quality of the earphone and improve the user experience during wearing of the earphone.

As follows, the present invention is described in detail in combination with the drawings for better understanding and implementation.

BRIEF DESCRIPTION OF THE DRAWINGS

The drawings are only for exemplary illustration and shall not be construed as a limitation of the present disclosure. To better illustrate the embodiments, some parts of the drawings may be omitted, enlarged, or minimized, which do not represent the size of the actual product. For those skilled in the art, it is understandable that some of the known structures and descriptions in the drawings may be omitted.

The FIGURE is a schematic diagram showing the structure of an open-ear earphone according to the present invention.

In the FIGURE, 1. housing; 11. first sound hole; 12. second sound hole; 2. chamber; 3. front chamber; 4. rear chamber; 41. first volume down chamber; 42. second volume down chamber; 421. sound-absorbing chambers; 43. first volume down hole; 44. second volume down hole; 5. speaker; 6. sound-absorbing material; 61. first sound-absorbing component; 62. second sound-absorbing components.

DETAILED DESCRIPTION OF THE EMBODIMENTS

The orientation terms, such as up, down, left, right, front, back, front side, back side, top, bottom, and others that are mentioned or may be mentioned in the specification are defined relative to their construction, and all of them are relative concepts. They may change according to their different positions and use states. Therefore, these or other orientation expressions shall not be interpreted as restrictive terms.

The embodiments described in the following exemplary embodiments do not represent all embodiments consistent with the present disclosure. Instead, they are only examples of embodiments that are consistent with some aspects of the present disclosure.

The terms used in the present disclosure are solely for the purpose of describing specific embodiments and are not intended to limit the present disclosure. As used in the present disclosure, the singular forms of "a/an," "said," and "the" are also intended to include the plural form unless the context clearly states otherwise. It should also be understood that the term "and/or" used in the text refers to including any or all possible combinations of one or more associated listed items.

The present invention is further described in detail in combination with the drawings.

Referring to the FIGURE, the present invention discloses an open-ear earphone, which includes the housing 1. The chamber 2 is provided inside the housing 1, and the speaker 5 is provided inside the chamber 2. The speaker 5 divides the chamber 2 into the front chamber 3 and the rear chamber 4. The housing 1 is also provided with the first sound hole 11 and the second sound hole 12. The front chamber 3 is communicated to the outside through the first sound hole 11, and the rear chamber 4 is communicated to the outside through the second sound hole 12. The rear chamber 4 includes the first volume down chamber 41 and the second volume down chamber 42 communicated to the first volume down chamber 41. The first volume down chamber 41 is located between the speaker 5 and the second volume down chamber 42. The first volume down chamber 41 and the second volume down chamber 42 are communicated through the first volume down hole 43.

When the speaker 5 generates sound, the sound wave in forward motion generated by the speaker 5 is transmitted from the first sound hole 11 to the outside. When in use, the sound from the first sound hole 11 is transmitted to the user's ears to facilitate the user's hearing of the sound. The sound wave in backward motion generated by the speaker 5 is transmitted to the outside from the second sound hole 12 after being reduced by the first volume down chamber 41 and the second volume down chamber 42. As the sound wave in backward motion generated by speaker 5 is reduced by the first volume down chamber 41 and the second volume down chamber 42, the sound wave in backward motion is significantly reduced. Thus, the influence of the sound wave in backward motion generated by the speaker 5 on the sound wave in forward motion generated by speaker 5 is reduced to reduce the occurrence of acoustic short-circuit phenomenon around the first sound hole 11, which is beneficial to optimize the sound quality and improve the user experience during wearing of the earphone. The front chamber 3, the first volume down chamber 41, and the second volume down chamber 42 are arranged between the first sound hole 11 and the second sound hole 12, which makes the distance between the first sound hole 11 and the second sound hole 12 relatively increased to reduce the influence of the sound transmitted from the second sound hole 12 on the sound transmitted from the first sound hole 11 and to reduce the occurrence of acoustic short-circuit phenomenon around the first sound hole 11, which is beneficial to further optimize the sound quality and further improves the user experience during wearing of the earphoneearphone.

In some embodiments, the second volume down chamber 42 includes at least two sound-absorbing chambers 421 communicated to each other. One of the sound-absorbing chambers 421 is located between another one of the sound-absorbing chambers 421 and the first volume down chamber 41, and another one of the sound-absorbing chambers 421 is communicated to the outside through the second sound hole 12. When the speaker 5 generates sound and after the sound wave in backward motion generated by the speaker 5 is acted by the first volume down chamber 41 and the at least two sound-absorbing chambers 421, the sound transmitted from the second sound hole 12 is effectively reduced, thereby reducing the influence of the sound transmitted from the second sound hole 12 on the sound transmitted from the first sound hole 11 and reducing the occurrence of acoustic short-circuit phenomenon, which is beneficial to optimize the sound quality of the earphoneearphone and improve the user experience during wearing of the earphone.

In some embodiments, the axis of the first volume down chamber 41 and the axes of the at least two sound-absorbing chambers 421 are located in the same straight line, that is, the first volume down chamber 41 and the at least two sound-absorbing chambers 421 are arranged in sequence. The axis of the first volume down chamber 41 and the axes of the at least two sound-absorbing chambers 421 can also not be on the same straight line, that is, the first volume down chamber 41 and the at least two sound-absorbing chambers 421 are not arranged in sequence. According to the specific situation, the positions of the first volume down chamber 41 and the at least two sound-absorbing chambers 421 can be set by those skilled in the art based on need. The axis of the front chamber 3, the axis of the first volume down chamber 41, and the axis of the second volume down chamber 42 are located on the same straight line, that is, the front chamber 3, the first volume down chamber 41, and the second volume down chamber 42 are arranged in sequence. The axis of the front chamber 3, the axis of the first volume down chamber 41, and the axis of the second volume down chamber 42 are not on the same straight line, that is, the front chamber 3, the first volume down chamber 41, and the second volume down chamber 42 are not arranged in sequence. According to the specific situation, the positions of the front chamber 3, the first volume down chamber 41, and the second volume down chamber 42 can be set by those skilled in the art based on need.

In some embodiments, the volume dimension of the rear chamber 4 is greater than volume dimension of the front chamber 3 so that the rear chamber 4 is set to be multiple chambers communicating with each other. The sound wave in backward motion generated by the speaker 5 can effectively reduce the sound transmitted from the second sound hole 12 under the action of the multiple chambers.

Specifically, the first sound hole 11 and the second sound hole 12 are each composed of a plurality of small holes. The first volume down chamber 41 and the second volume down chamber 42 are communicated through the first volume down hole 43, and the first volume down hole 43 is configured to maintain the equilibrium of sound pressure in the first volume down chamber 41. Two adjacent sound-absorbing chambers 421 are communicated through the second volume down hole 44. The second volume down hole 44 is configured to maintain the equilibrium of sound pressure in one of the at least two sound-absorbing chambers 421 close to the first volume down chamber 41. The second sound hole 12 is configured to maintain the equilibrium of sound pressure in one sound-absorbing chambers 421 away from the first volume down chamber 41. The first volume down hole 43 and the second volume down hole 44 are each composed of a plurality of small holes.

In some embodiments, the sound-absorbing material 6 is also included. The sound-absorbing material 6 includes sound-absorbing cotton, organic fiber cotton, inorganic fiber cotton, inorganic foam, foam plastic, and others. The sound-absorbing material 6 can be one or more of the sound-absorbing cotton, the organic fiber cotton, the inorganic fiber cotton, the inorganic foam, and the foam plastic. The sound-absorbing material 6 is arranged inside the rear chamber 4. Further, the sound-absorbing material 6 is arranged inside the first volume down chamber 41 and the second volume down chamber 42. Further, the sound-absorbing material 6 is arranged inside the at least two sound-absorbing chambers 421, that is, the inside of the first volume down chamber 41 and the at least two sound-absorbing chambers 421 are both arranged with the sound-absorbing material 6. The sound-absorbing material 6 includes the first sound-absorbing component 61 and the second sound-absorbing components 62. The first sound-absorbing component 61 is arranged inside the first volume down chamber 41 and is located on one side of the first volume down chamber 41 away from the speaker 5. The first sound-absorbing component 61 is formed with a chamber groove opening toward the speaker 5. For example, the first sound-absorbing component 61 can be set in the shape of "C," the first sound-absorbing component 61 can be set in the shape of "W," or the first sound-absorbing component 61 can also be set in the shape of "U". Those skilled in the art can set the shape of the first sound-absorbing component 61 according to the needs without restriction here. The second sound-absorbing components 62 are circularly arranged inside the second volume down chamber 42, that is, the second sound-absorbing components 62 are arranged inside the sound-absorbing chambers 421, and the second sound-absorbing components 62 are circularly arranged inside the second volume down chamber 42. The circular arrangement includes a rectangular arrangement, an ellipse arrangement, and the like. Those skilled in the art can set the shape of the second sound-absorbing components 62 based on the needs without restriction here.

When in use, the sound-absorbing material 6, the first volume down chamber 41, and the at least two sound-absorbing chambers 421 act together to reduce the sound wave in backward motion generated by the speaker 5, and the sound transmitted from the second sound hole 12 is further reduced, thereby reducing the influence of the sound transmitted from the second sound hole 12 on the sound transmitted from the first sound hole 11 and reducing the occurrence of acoustic short-circuit phenomenon, which is beneficial to optimize the sound quality of the earphone and improve the user experience during wearing of the earphone.

The embodiments of the specific implementation modes are all preferred embodiments of the present invention and do not limit the scope of protection of the present invention. Hence, any equivalent change made according to the structure, shape, and principle of the present invention shall fall within the protection scope of the present invention.

What is claimed is:

1. An open-ear earphone, comprising a housing, wherein a chamber is provided inside the housing, a speaker is provided inside the chamber, and the speaker divides the chamber into a front chamber and a rear chamber;

the housing is provided with a first sound hole and a second sound hole, the front chamber is communicated to an outside through the first sound hole, and the rear chamber is communicated to the outside through the second sound hole; and the rear chamber comprises a first volume down chamber and a second volume down chamber communicated to the first volume down chamber, wherein the first volume down chamber is located between the speaker and the second volume down chamber.

2. The open-ear earphone according to claim 1, wherein the second volume down chamber comprises at least two sound-absorbing chambers communicated to each other, wherein a first one of the at least two sound-absorbing chambers is located between a second one of the at least two sound-absorbing chambers and the first volume down chamber, and the second one of the at least two sound-absorbing chambers is communicated to the outside through the second sound hole.

3. The open-ear earphone according to claim 2, wherein an axis of the first volume down chamber and an axe of each of the at least two sound-absorbing chambers are located in a same straight line.

4. The open-ear earphone according to claim 3, wherein a sound-absorbing material is further comprised, and the sound-absorbing material is arranged inside the rear chamber.

5. The open-ear earphone according to claim 2, wherein a sound-absorbing material is further comprised, and the sound-absorbing material is arranged inside the rear chamber.

6. The open-ear earphone according to claim 1, wherein an axis of the front chamber, an axis of the first volume down chamber, and an axis of the second volume down chamber are located on a same straight line.

7. The open-ear earphone according to claim 6, wherein a sound-absorbing material is further comprised, and the sound-absorbing material is arranged inside the rear chamber.

8. The open-ear earphone according to claim 1, wherein a volume dimension of the rear chamber is greater than a volume dimension of the front chamber.

9. The open-ear earphone according to claim 8, wherein a sound-absorbing material is further comprised, and the sound-absorbing material is arranged inside the rear chamber.

10. The open-ear earphone according to claim 1, wherein a sound-absorbing material is further comprised, and the sound-absorbing material is arranged inside the rear chamber.

11. The open-ear earphone according to claim 10, wherein the sound-absorbing material comprises a first sound-absorbing component and second sound-absorbing components, wherein the first sound-absorbing component is arranged inside the first volume down chamber, and the second sound-absorbing components are arranged inside the second volume down chamber.

12. The open-ear earphone according to claim 11, wherein the first sound-absorbing component is located on a side of the first volume down chamber away from the speaker, and the first sound-absorbing component is formed with a chamber groove opening toward the speaker.

13. The open-ear earphone according to claim 11, wherein the second sound-absorbing components are circularly arranged inside the second volume down chamber.

14. The open-ear earphone according to claim 10, wherein the sound-absorbing material comprises at least one selected from the group consisting of a sound-absorbing cotton, an organic fiber cotton, an inorganic fiber cotton, an inorganic foam, and a foam plastic.

* * * * *